United States Patent [19]
Grubb et al.

[11] Patent Number: 5,673,280
[45] Date of Patent: Sep. 30, 1997

[54] ARTICLE COMPRISING LOW NOISE OPTICAL FIBER RAMAN AMPLIFIER

[75] Inventors: Stephen Gregory Grubb, Warren; Andrew John Stentz, Scotch Plains; Kenneth Lee Walker, New Providence, all of N.J.

[73] Assignee: Lucent Technologies Inc., Murray Hill, N.J.

[21] Appl. No.: 600,354

[22] Filed: Feb. 12, 1996

[51] Int. Cl.$^6$ ................................................ H01S 3/30
[52] U.S. Cl. ........................ 372/3; 372/6; 372/703
[58] Field of Search ........................ 372/3, 6, 98, 92, 372/703, 69

[56] References Cited

U.S. PATENT DOCUMENTS

| | | | |
|---|---|---|---|
| 4,782,491 | 11/1988 | Snitzer | 372/6 |
| 5,323,404 | 6/1994 | Grubb | 372/6 |

OTHER PUBLICATIONS

"High-gain, Monolithic, Cascaded Fibre Raman Amplifier Operating at 1.3 μm", by S. V.Chernikov et al. *Electronics Letters*, vol. 31, No. 6, 16th Mar. 1995, pp. 472–473.

"Nonlinear fiber Optics", by G. P. Agrawal, Academic Press, 2nd Edition, 1995, pp. 16–19, and pp. 316–335.

"Properties of Fiber Raman Amplifiers and Their Applicability to Digital Optical Communication Systems", by Y. Aoki, *Journal of Lightwave Technology*, vol. 6, No. 7, Jul. 1988, pp. 1225–1239.

"Noise Properties of a Raman Amplifier", by N. A. Olsson et al., *Journal of Lightwave Technology*, vol. LT–4, No. 4, Apr. 1986, pp. 396–399.

"Bit Error Rate Evaluation of Optical Signals Amplified Via Stimulated Raman Process in an Optical Fibre", by Y. Aoki et al., *Electronics Letters*, vol. 21, No. 5, 28th Feb. 1985, pp. 191–193.

"CW Pumped Raman Preamplifier in a 45 km–Long Fibre Transmission System Operating at 1.5·μm and 1 Gbit/s", by J. Hegarty et al., *Electronics Letters*, vol. 21, No. 7, 28th Mar. 1985, pp. 290–292.

"Gain Limit in Erbium–Doped Fiber Amplifiers Due to Internal Rayleigh Backscattering", by S. L. Hansen et al., *IEEE Photonics Technology Letters*, vol. 4, No. 6, Jun. 1992, pp. 559–561.

"EDFA Noise Figure Degradation Caused by Amplified Signal Double Rayleigh Scattering in Erbium Doped Fibres", by F. W. Willems et al., *Electronics Letters*, vol. 30, No. 8, 14th Apr. 1994, pp. 645–646.

"Performance Improvement and Optimization of Fiber Amplifier with a Midway Isolator", by S. Yamashita et al., *IEEE Photonics Technology Letters*, vol. 4, No. 11, Nov. 1992.

"Observation of Equivalent Rayleigh Scattering Mirrors in Lightwave Systems with Optical Amplifiers", by J. L. Gimlett et al., *IEEE Photonics Technology Letters*, vol. 2, No. 3, Mar. 1990.

*Primary Examiner*—Leon Scott, Jr.
*Attorney, Agent, or Firm*—Eugen E. Pacher

[57] ABSTRACT

A low noise optical fiber Raman amplifier (FRA) comprises an upstream and a downstream length of silica-based amplifier fiber, of combined length >200 m, typically >1 km, with an optical isolator disposed between the upstream and downstream lengths of amplifier fiber such that passage of backscattered signal radiation from the latter to the former is substantially blocked. In preferred embodiments counter-propagating pump radiation is coupled into the downstream length of amplifier fiber, and wavelength-selective means are provided for shunting the pump radiation around the optical isolator. The described FRA is advantageously incorporated into optical fiber communication systems. Exemplarily it can serve as power amplifier, as pre-amplifier, or as in-line amplifier. For instance, it can be used to replace conventional opto-electronic repeaters in existing 1.3 μm fiber communication systems, or it can be used as power amplifier in a multi-subscriber optical fiber CATV system. In a still further exemplary embodiment, the FRA is used as a distributed pre-amplifier in a remotely pumped fiber communication system.

12 Claims, 4 Drawing Sheets

ARTICLE COMPRISING LOW NOISE OPTICAL FIBER RAMAN AMPLIFIER

RELATED APPLICATION

This application is related to co-assigned U.S. patent application Ser. No., of title "Article Comprising a Counter-Pumped Optical Raman Amplifier", filed concurrently with this by the inventors of the instant application, and incorporated herein by reference.

FIELD OF THE INVENTION

This application pertains to optical fiber Raman amplifiers, and to optical fiber communication systems comprising such amplifiers.

BACKGROUND OF THE INVENTION

Erbium-doped optical fiber amplifiers (EDFAs) are well known, and have reached a high level of development. However, these amplifiers are limited to wavelengths of about 1.5 µm. Indeed, at present there are no practical silica-based rare earth doped fiber amplifiers that can be used to provide gain at wavelengths of about 1.3 µm, the operating regime of most currently operating optical fiber communication systems. See, for instance, S. V. Chernikov et al., *Electronics Letters*, Vol. 31 (6), p. 472, (March 1995).

Optical fiber Raman amplifiers are known, and can be designed to operate at a desired wavelength at or near 1.3 µm. See, for instance, S. V. Chernikov et al., op. cit. Indeed, Raman amplifiers are potentially promising candidates for such use because they can utilize silica-based fiber, and because of their high transparency when unpumped. For background information on stimulated Raman scattering see, for instance, "Nonlinear Fiber Optics", G. P. Agrawal, 2nd edition, Academic Press 1995, especially pages 16–19, and 316–335, incorporated herein by reference. See also U.S. Pat. No. 5,323,404, also incorporated herein by reference, which inter alia discloses fiber Raman amplifiers with a multiplicity of optical "cavities".

Although it is relatively easy to generate large gains (e.g., small signal gain>40 dB) through Raman amplification, prior art high gain Raman amplifiers generally are noisy, and we are not aware of any prior art FRAs that have both high net gain (e.g., >20 dB) and low noise (e.g., <6 dB), where by "net gain" we mean the signal power just after the FRA, divided by the signal power just before the FRA.

One known source of excess amplifier noise is increased (above the inherent quantum limit of 3 dB) signal-spontaneous beating due to unavoidable passive loss of the amplifier. See Y. Aoki, *Journal of Lightwave Technology*, Vol. 6, p. 1225 (1988), which teaches (p. 1228, first column, first full paragraph) that in fiber Raman amplifiers (FRAs) " ... the dominant noise light is amplified spontaneous emission or ASE, which arises as a result of the summation of the spontaneous emission over the fiber length."

In view of the great potential of Raman amplifiers for use in optical fiber systems, e.g., as a replacement for conventional repeaters in 1.3 µm systems, it would be highly desirable to have available Raman amplifiers having relatively high gain and improved noise characteristics. This application discloses such amplifiers.

N. A. Olsson et at., *J. Lightwave Technology*, Vol. LT 4 (4), p. 396 (April 1986) report measurements of the noise properties of a FRA, with signal-spontaneous emission beating being the dominant noise source. These authors also report (see p. 396, first column, first paragraph of section II) that use of counter-propagating pump radiation greatly reduces high frequency noise due to pump fluctuations. See also Y. Aoki et at., *Electronics Letters*, Vol. 21 (5), p. 192 (1985), and J. H. Hegarty, *Electronics Letters*, Vol. 21 (7), p. 290 (1985). The use of a counter-propagating geometry also decreases crosstalk between different channels in WDM systems.

A great deal of research has been done on the properties of EDFAs. For instance, S. L. Hansen et at., *IEEE Photonics Technology Letters*, Vol. 4 (6), p. 559 (June 1992) consider the limit placed on the maximum gain of EDFAs, and report observation of a significant amount of amplified Rayleigh back-scattering (RBS), although the gain was limited by ASE saturation rather than RBS. They also report insertion of an optical isolator (and use of two WDMs to guide the pump radiation around the isolator), with attendant increase in the achievable gain. See, for instance, p. 561, last two paragraphs of "Discussion".

F. W. Willems et at., *Electronics Letters*, Vol. 30 (8), p. 645 (April 1994) measured the noise in EDFAs due to amplified double Rayleigh scattering, and found that attention to this noise source may be advisable for externally modulated analog AM-CATV systems. See, for instance, the "Conclusions" section.

S. Yamashita et al., *IEEE Photonics Technology Letters*, Vol. 4 (11), p. 1276 (November 1992) disclose that the noise and gain characteristics of an EDFA are improved by insertion of a "midway" isolator into the active fiber, with the optimal isolator position being $\frac{1}{3}$–$\frac{1}{2}$ of the total active fiber length from the input length. See, for instance, p. 1278, last paragraph.

RBS in optical fibers is well known. J. L. Gimlett et al., *IEEE Photonics Technology Letters*, Vol. 2 (3), p. 211 (March 1990) disclose that RBS " ... can be modeled as a "Rayleigh mirror" which in lightwave systems with optical amplifiers has the same effect as a single discrete reflection with an effective reflectance given by $(R_{bs}/\sqrt{2})$, where $R_{bs}$ is the backscattering reflectance", and that optical isolation may be essential for fiber systems using high-gain optical amplifiers. See, for instance, p. 213, last paragraph. The reported measurements were obtained on a system comprising 30 m of Er-doped fiber between long lengths (120 km and 18 km, respectively) of optical fiber.

SUMMARY OF THE INVENTION

In a broad aspect the invention is embodied in an article that comprises a FRA which can have substantially improved noise properties, as compared to an analogous prior art FRA. In an exemplary embodiment, the article is an optical fiber communication system, the system comprising a transmitter, a receiver that is spaced apart from the transmitter (typically hundreds or even thousands of kilometers apart), and an optical fiber transmission path that signal-transmissively connects the transmitter and the receiver. The transmission path comprises one or more FRAs according to the invention. The direction from transmitter to receiver is the "downstream" direction, and the opposite direction is the "upstream" direction. Analogously, a point of the transmission path is "downstream" ("upstream") of another such point if the former lies in the downstream (upstream) direction from the latter. In another exemplary embodiment the article is an FRA according to the invention.

An FRA according to the invention comprises an input port (e.g., comprising a short length of fiber adapted for splicing to optical fiber), an output port (e.g., also comprising a short length of fiber), and an optical fiber path that signal-transmissively connects the input and output ports and comprises silica-based optical fiber (including Ge-doped and/or P-doped fiber), the fiber to be referred to as "amplifier fiber" because signal amplification by stimulated Raman scattering takes place in the fiber during amplifier operation. The FRA also comprises means for coupling pump radiation (of wavelength $\lambda_p$ less than the signal wavelength $\lambda_s$) into the amplifier fiber such that the pump radiation propagates in the amplifier fiber (in the upstream direction) towards the input port.

Significantly, the amplifier fiber comprises at least a first length $L_1$ and a second length $L_2$ of amplifier fiber, with the first length being disposed upstream of the second length. Furthermore, the FRA comprises an optical isolator disposed between the first and second lengths of amplifier fiber such that passage of radiation of wavelength $\lambda_s$ from the second to the first length of amplifier fiber is substantially blocked.

In preferred embodiments the means for coupling the pump radiation into the amplifier fiber are disposed to couple the pump radiation into the second length of amplifier fiber at or near the downstream end thereof, and the FRA further comprises wavelength-selective coupling means selected to facilitate passage of pump radiation from the second to the first length of amplifier fiber, by-passing the optical isolator.

Typically, the first and second lengths together constitute essentially all of the amplifier fiber in a FRA according to the invention. Associated with a FRA is a noise figure. The noise figure of an exemplary FRA according to the invention exemplarily is at least 2 dB, preferably at least 5 dB less than the noise figure of a comparison (prior art) FRA that differs from the inventive FRA only in having an undivided length of amplifier fiber of length $L_1+L_2$.

Although currently not preferred, the invention can also be embodied in a multistage FRA wherein each of the stages is separately pumped, e.g., by means of separate pump sources or, possibly, from a single pump source that is split into two or more beams. In such a FRA it will frequently not be necessary to provide means for by-passing the optical isolator (or isolators).

In typical embodiments $\lambda_s$ is about 1.3 μm, with $\lambda_p$ exemplarily being about 1.24 μm.

Optical isolators are well known and are commercially available, as are wavelength-selective coupling means. An example of the latter is a fused fiber coupler, conventionally referred to as a WDM.

Due to the small magnitude of the Raman gain coefficient of typical silica-based optical fibers, the length of the amplifier fiber in FRAs typically is in the range from a few hundreds of meters to several kilometers, exemplarily more than 200 m. The length of amplifier fibers in FRAs thus typically greatly exceeds that of EDFAs, which typically have amplifier fiber lengths in the range from a few meters to about hundred meters. This difference in amplifier fiber length between FRAs and EDFAs results in significant differences in noise characteristics between FRAs and EDFAs, with some noise-producing mechanisms that are important in FRAs being of no practical significance in EDFAs. Among these mechanisms are double RBS and Brillouin scattering in the amplifier fiber.

We have discovered that noise in FRAs due to double RBS and/or Brillouin scattering can be significantly reduced if the desired gain G is produced in two (or more) amplifier stages, with an optical isolator disposed between the two stages. In currently preferred embodiments, pump radiation and signal are counter-propagating, thereby substantially reducing noise due to pump power fluctuations. It is also currently preferred to couple all the pump radiation into the downstream end of the downstream amplifier stage, and provide means for shunting pump radiation around the isolator. However, in the alternative, pump radiation (from one or more sources) could be coupled into the downstream end of each amplifier stage.

DETAILED DESCRIPTION OF A PREFERRED EMBODIMENT

We have found that double RBS and Brillouin scattering can be serious noise sources in typical FRAs, due largely to the relatively long length of amplifier fiber of typical FRAs. Indeed, it can be shown that double RBS increases as the square of the length of the amplifier fiber. Thus, noise due to this mechanism can be several orders of magnitude more in FRAs than in EDFAs, requiring design features in the former that may be inappropriate in the latter.

Figure 1:
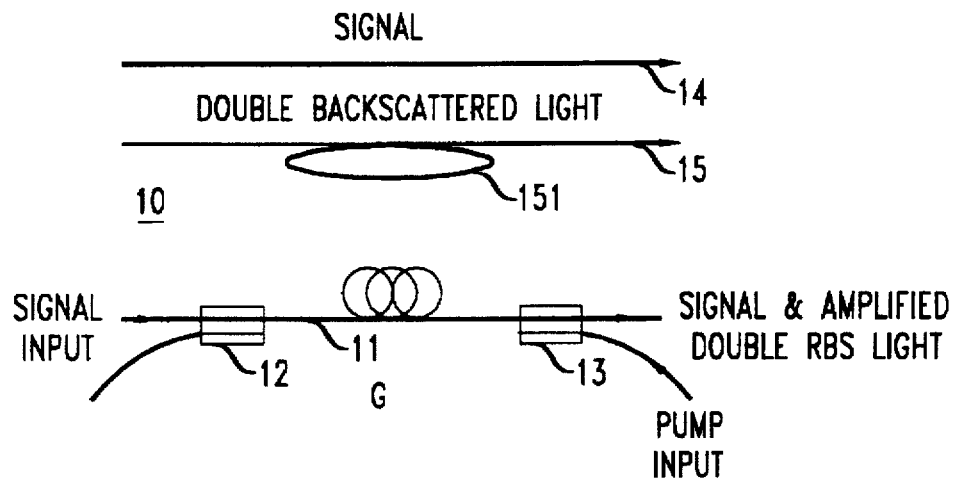
FIG. 1 schematically depicts a prior art FRA, with a significant amount of double backscattered light co-propagating with the signal.

FIG. 1 schematically shows a prior art (single stage) FRA 10, wherein numerals 11 to 13 refer to the undivided amplifier fiber of length L, and the upstream and downstream WDMs, respectively. Arrow 14 refers to the signal that propagates through the FRA, and 15 refers to double backscattered light that co-propagates with the signal, with the relatively large size of ellipse 151 intended to indicate a relatively large amount of amplified double backscattered radiation. Double RBS light is twice backscattered by unavoidable density fluctuations in the amplifier fiber such that it propagates in the downstream direction and adds noise to the signal. Although the amplitude of RBS light is generally small, the light is amplified in the same way the signal is amplified in the FRA, resulting in significant noise amplitude.

A further noise mechanism that is typically insignificant in EDFAs but can be significant in FRAs is Brillouin scattering. In the case of Brillouin scattering, the amplified signal couples to an acoustic phonon in the fiber and generates a counter-propagating wave, thereby reducing the signal amplitude. If the Brillouin scattered light experiences in the amplifier fiber a second reflection (e.g., due to Rayleigh scattering), the twice-scattered (and amplified) light will again interfere with the signal, thereby degrading the amplifier's performance.

Figure 2:
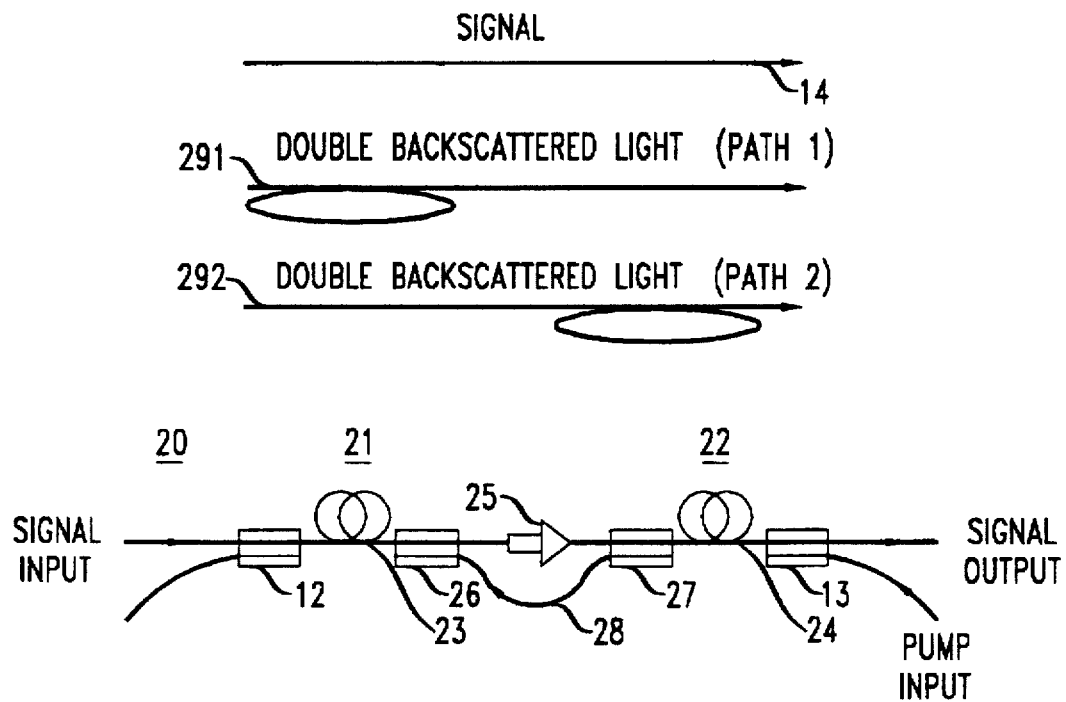
FIG. 2 shows schematically an exemplary two-stage FRA according to the invention, with significantly reduced double backscattered light.

FIG. 2 schematically depicts an exemplary FRA 20 according to the invention. Numerals 21 and 22 refer to the first and second amplifier stages, respectively, and numerals 23 and 24 refer to the first and second amplifier fibers, respectively. Numerals 25–28 refer to the interstage optical isolator, the upstream and downstream interstage WDMs, and the fiber that shunts pump radiation around isolator 25. The lengths of the first and second amplifier fibers are not necessarily equal. Exemplarily, they are chosen such that each stage produces a gain of G/2 dB, the gain of the combination thus being G dB, e.g., 20 dB or more.

FIG. 2 also shows signal 14, light 291 that has undergone double RBS in the upstream amplifier fiber, and light 292 that has undergone double RBS in the downstream amplifier fiber. As will be readily appreciated by those skilled in the art, the two-stage FRA of the invention adds considerably less than does an analogous than does an analogous single stage prior art FRA that differs from the former only in having an undivided amplifier fiber of length L, (i.e., without WDMs 26 and 27, isolator 25 and by-pass fiber 28).

It can be shown that use of co-propagating pump radiation instead of counter-propagating pump radiation can lead to a slightly smaller noise contribution from signal-spontaneous beating. However, the benefits that are gained by use of counter-propagating pump radiation outweigh the detriment of slightly higher noise due to signal-spontaneous beating. In particular, use of counter-propagating pump radiation can substantially eliminate pump-signal crosstalk, as demonstrated by FIGS. 3–5.

Figure 3:
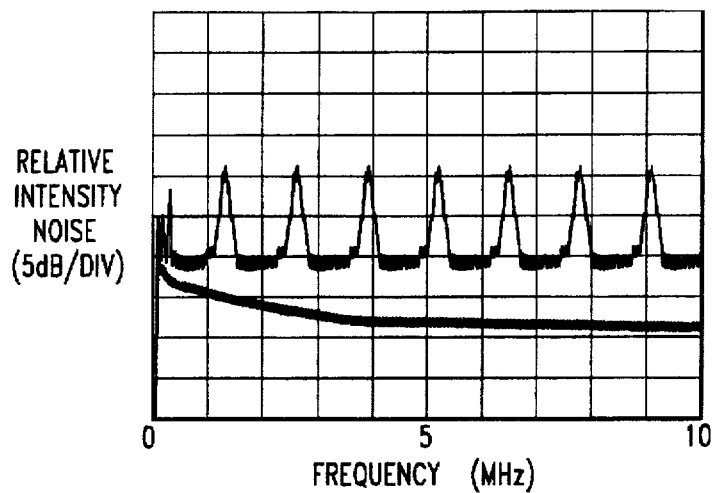
FIGS. 3–5 show the power spectrum of exemplary 1240 nm pump radiation, and of 1300 nm signal radiation amplified with co-propagating and counter-propagating pump radiation, respectively.

FIG. 3 shows the RF power spectrum of an exemplary 1240 nm Raman pump laser. The large noise spikes are caused by beating of the longitudinal laser modes, and are substantially unavoidable, due to the necessity of lasing on many longitudinal modes in order to prevent Brillouin scattering of the pump radiation.

Figure 4:
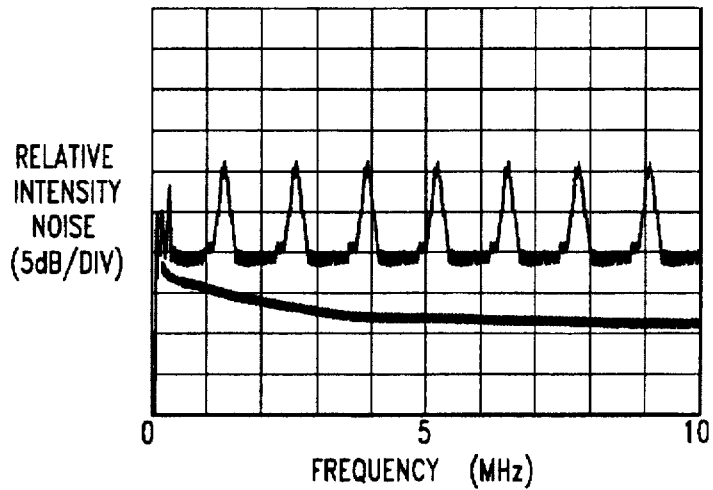

FIG. 4 shows the RF power spectrum of 1300 nm signal radiation after amplification by co-propagating Raman pump radiation, and clearly demonstrates that noise spikes from the pump radiation are transferred to the signal.

Figure 5:
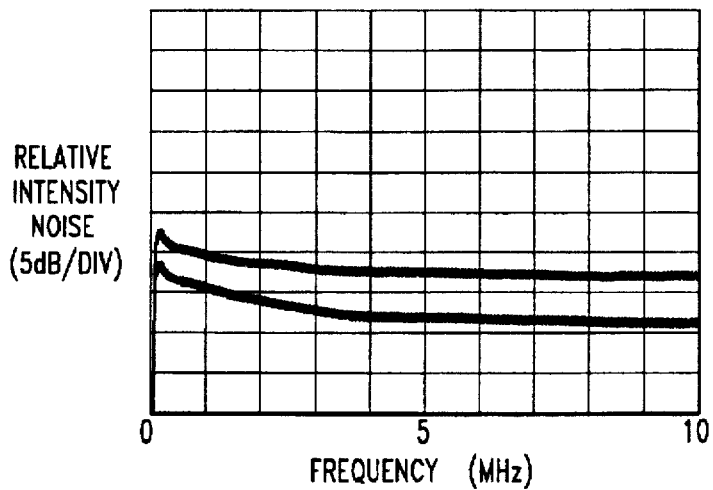

FIG. 5 shows the RF power spectrum of the 1300 nm signal after amplification by counter-propagating pump radiation. The spectrum is free of pump noise spikes. This clearly establishes the advantage of counter-propagating Raman pumping.

In a Raman amplifier with strictly counter-propagating pump radiation that have significant net gain (e.g., >10 dB), multi-path interference due to double RBS is typically the dominant source of noise. We have discovered that an effective technique for decreasing double RBS is provision of a multistage Raman amplifier, with an interstage optical isolator between adjacent stages. A multistage Raman amplifier with interstage isolator also increases the threshold for Brillouin scattering. Brillouin scattered light is generated only in the backwards propagating direction. Thus, any Brillouin scattered light generated in the second (downstream) stage of such a multistage Raman amplifier is absorbed by the interstage isolator.

Figure 6:
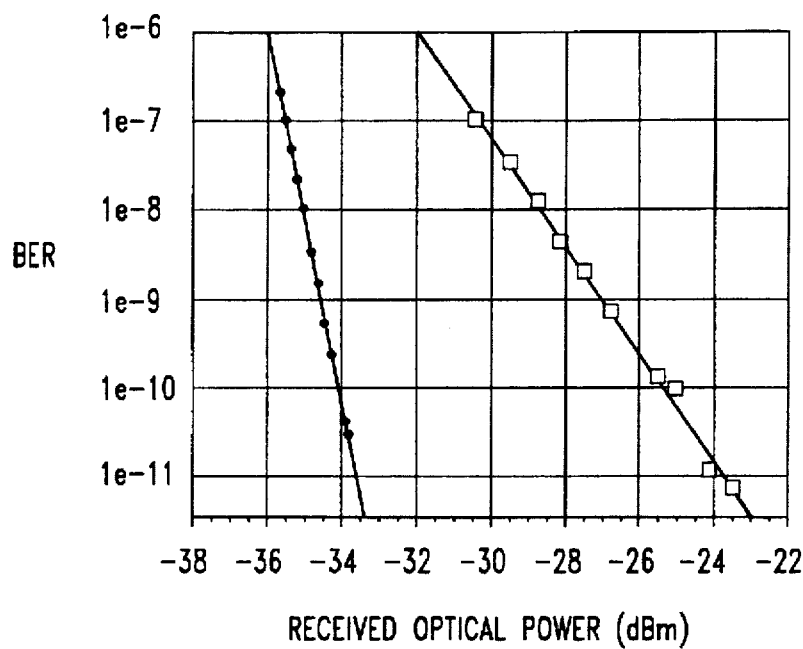
FIGS. 6 and 7 show exemplary data on bit-error tests for a prior art one-stage Raman amplifier and a two-stage amplifier according to the invention.
Figure 7:
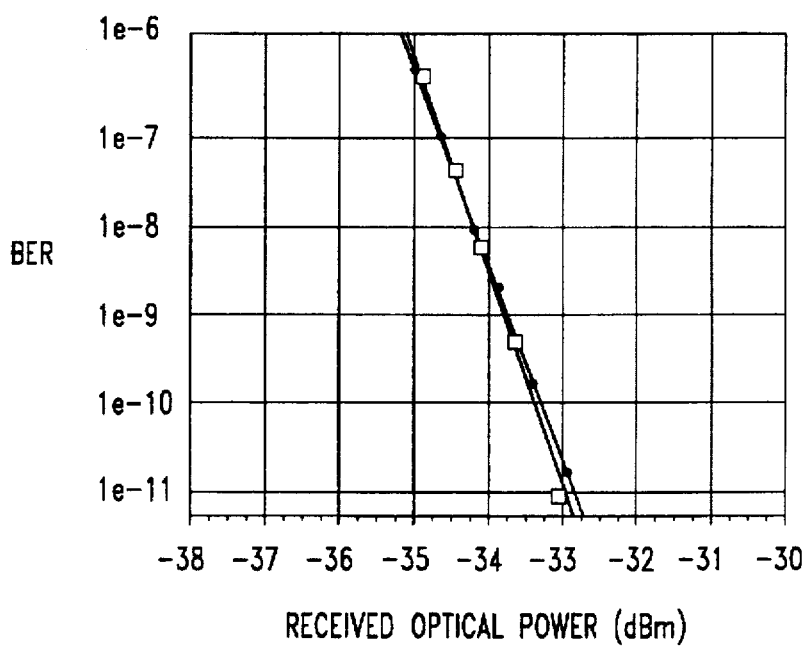

FIGS. 6 and 7 provide comparative data for a prior an single stage Raman amplifier and a multistage Raman amplifier according to the invention, respectively. While generating a gain of 19 dB, the prior art amplifier created a power penalty of 7 dB at $10^{-9}$ BER (bit error rate), as shown by FIG. 6. In contrast, an analogous 2-stage amplifier according to the invention generated gains as large as 26 dB with essentially no power penalty, as demonstrated by FIG. 7. Both amplifiers used a counter-propagating pump geometry, and all measurements were taken at 2.5 Gb/s.

Optical fiber communication systems according to the invention can take a variety of forms. For instance, a FRA according to the invention can serve as a power amplifier disposed close to the transmitter, it can serve as a pre-amplifier disposed close to the receiver, or it can be disposed between transmitter and receiver, spaced by a substantial distance (e.g., 100 km) from the closer of the two. An example of the latter is an upgraded 1.3 μm optical fiber communication system wherein FRAs according to the invention are used to replace conventional opto-electronic repeaters.

Figure 8:
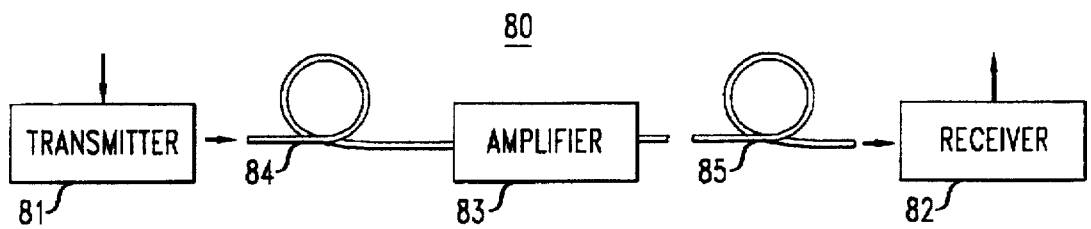
FIGS. 8–10 schematically show exemplary optical fiber communication systems according to the invention.

FIG. 8 schematically depicts an optical fiber communication system 80 according to the invention, wherein numerals 81–84 refer, respectively, to transmitter, receiver, FRA according to the invention, and optical transmission fiber.

Figure 9:
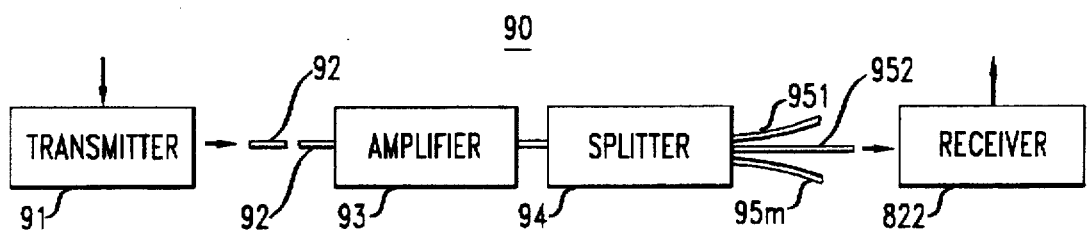

FIG. 9 schematically shows another exemplary embodiment of the invention, namely, a multi-receiver communication system 90, wherein an FRA according to the invention serves as power amplifier that facilitates provision of a signal (exemplarily an analog signal, e.g., a CATV signal) to a multiplicity of receivers (subscribers). Numerals 91–94 refer, respectively, to transmitter, transmission fiber, FRA and splitter. Further amplifiers may be disposed between the transmitter and the FRA but are not shown. Splitter 94 divides the amplified signal into n signals that respectively propagate through fibers 951–95n to receivers 961–96n (of which only 962 is shown).

Figure 10:
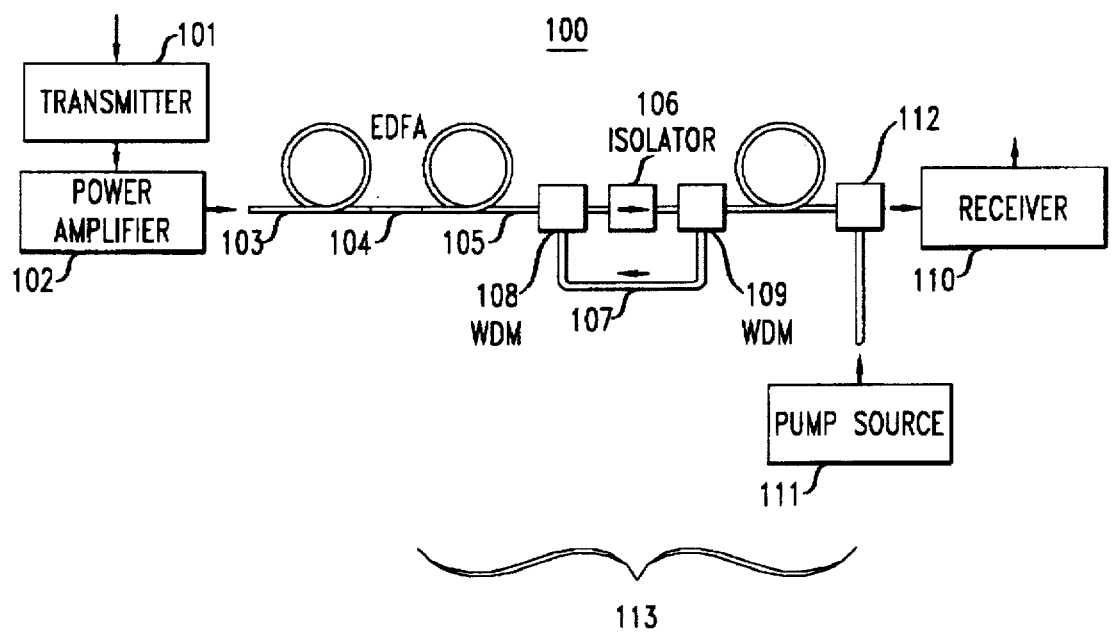

FIG. 10 schematically depicts a further embodiment of the invention, namely, a remotely pumped communication system 100. It will be noticed that all electronic and opto-electronic apparatus is associated with the terminals, and the remainder of the system is purely optical. Typically, the terminals are situated on land (e.g., on a first and a second island), and the fiber transmission path that links the terminals is under the sea. Exemplarily, the system comprises transmitter 101 and receiver 110. Optional power amplifier 102 (e.g., an EDFA) amplifies the optical signal provided by the transmitter, and the amplified optical signal is coupled into conventional transmission fiber 103. At an appropriate point between transmitter and receiver (e.g., about halfway), a length of Er-doped optical fiber 104 is connected between fibers 103 and 105. Pump source 111 (e.g, a cascaded Raman fiber laser) provides pump radiation of a wavelength (e.g., 1480 nm) suitable for pumping Er-doped fiber 104. The pump radiation is coupled into fiber 105 by conventional means (e.g., WDM 112), and propagates in upstream direction towards the Er-doped fiber. At an appropriate point between receiver and Er-doped fiber (e.g., about halfway) is disposed optical isolator 106, with WDMs 108 and 109 and fiber 107 enabling the pump radiation to by-pass the isolator, and to proceed through remaining fiber 105 to Er-doped fiber 104. It will be noted that radiation of wavelength 1480 nm not only can serve as pump for a conventional EDFA but also can serve as pump for a silica-based FRA. Thus, section 113 of the fiber communication system of FIG. 10 constitutes a FRA according to the invention, providing gain to the signal. In effect, section 113 serves as a distributed, relatively low noise, pre-amplifier for receiver 110.

In at least some instances it may be desirable to tailor (typically flatten) the gain spectrum of an optical fiber amplifier, e.g., an amplifier according to the invention. This can be accomplished, for instance, by provision of an interstage filter with wavelength-dependent transmission characteristics, or by tailoring of the pump spectrum, e.g., by provision of a filter with wavelength-dependent transmission characteristics in the cavity of the laser or between the pump laser and the fiber amplifier.

EXAMPLE 1

A FRA substantially as shown in FIG. 2 was assembled and tested. The exemplary amplifier contained three commercially available 1.3 μm polarization-insensitive isolators, one disposed just upstream of WDM 12, one disposed between the amplifier stages as shown in FIG. 2, and one disposed just downstream of WDM 13. WDMs 12, 13, 26 and 27 were commercially available 1240 nm:1310 nm fused fiber couplers. Amplifier fibers 23 and 24 were, respectively, 4 km and 2.85 km germanosilicate fiber with a depressed cladding, $\Delta=1.6\%$, and an effective core area of about 15 μm$^2$ at $\lambda=1.3$ μm. The amplifier was pumped with the output of a 1240 nm cascaded Raman laser which was pumped with the output of a 1060 nm cladding-pumped Nd fiber laser.

The FRA was tested in conventional manner. Signal radiation of wavelength 1310 nm was coupled into the input port, and amplified signal radiation was received at the output port. The results were compared to a one-stage amplifier that differed from the IRA according to the invention only with respect to elements 25–28 of FIG. 2, with the 2-stage amplifier transformed into the 1-stage (comparison) amplifier by removal of the designated elements, and conventionally coupling fiber 24 to fiber 23. Bit-error-rate tests of both amplifiers were performed. Exemplary results are shown in FIGS. 6 and 7. The 1-stage FRA generated 19 dB net gain while introducing a power penalty of 7 dB, whereas the 2-stage FRA according to the invention generated up to 26 dB of net gain without introducing a power penalty.

The invention claimed is:

1. An article comprising an optical fiber Raman amplifier comprising a) an input port;

b) an output port;

c) an optical fiber path that signal-transmissively connects said input and output ports, said optical fiber path comprising silica-based amplifier fiber; and d) means for coupling a pump radiation of wavelength $\lambda_p$ less than a signal wavelength $\lambda_s$ into said silica-based amplifier fiber such that the pump radiation propagates in said silica-based amplifier fiber in an upstream direction towards said input port;

CHARACTERIZED IN THAT e) said silica-based amplifier fiber comprises at least a first length $L_1$ of amplifier fiber and a second length $L_2$ of amplifier fiber, with the first length being upstream of the second length, and $L_1+L_2$ being more than 200 m;

f) the optical fiber Raman amplifier comprises an optical isolator disposed between said first and second lengths of amplifier fiber such that passage of at least radiation of wavelength $\lambda_s$ from the second to the first length of amplifier fiber is substantially blocked.

2. Article according to claim 1, wherein the means for coupling the pump radiation are selected to couple the pump radiation into the second length of amplifier fiber, and the optical fiber Raman amplifier further comprises wavelength-selective coupling means selected to facilitate passage of pump radiation from the second to the first length of amplifier fiber by by-passing the optical isolator.

3. Article according to claim 1, wherein $\lambda_s$ is approximately 1.3 μm, $\lambda_p$ is approximately 1.24 μm, and $L_1+L_2$ is more than 1 km.

4. Article according to claim 1, wherein the first and second lengths of amplifier fiber together constitute essentially all of the silica-based amplifier fiber in said optical fiber Raman amplifier.

5. Article according to claim 1, wherein associated with the optical fiber Raman amplifier is a noise figure, said noise figure being at least 2 dB less than a noise figure of a comparison optical fiber Raman amplifier that differs from said fiber Raman amplifier only in having an undivided amplifier fiber of length $L_1+L_2$.

6. Article according to claim 1, wherein the article is an optical fiber communication system that comprises a transmitter for signal radiation of wavelength $\lambda_s$, a receiver spaced apart from the transmitter, and a transmission path that connects said transmitter and said receiver for said signal radiation of wavelength $\lambda_s$, said transmission path comprising said optical fiber Raman amplifier, and said optical fiber communication system further comprising a source of said pump radiation of wavelength $\lambda_p$.

7. Article according to claim 6, further comprising means for splitting an output signal of said optical fiber Raman amplifier into a multiplicity of signals.

8. Article according to claim 6, wherein the transmission path comprises at least two spaced apart optical fiber Raman amplifiers, with silica-based optical fiber signal-transmissively connecting the output port of one of said optical fiber Raman amplifiers to the input port of the other of said optical fiber Raman amplifiers.

9. Article according to claim 6, wherein the transmission path comprises a length of erbium doped optical fiber, $\lambda_p$ is about 1480 nm, $\lambda_s$ is about 1550 nm, the first and second lengths of amplifier fiber are disposed between the receiver and the erbium doped optical fiber, and constitute substantially all of the transmission path between the receiver and the erbium doped optical fiber, and the optical fiber Raman amplifier further comprises wavelength-selective coupling means selected to facilitate passage of pump radiation from the second to the first length of amplifier fiber by by-passing the optical isolator.

10. Article according to claim 1, wherein said silica-based amplifier fiber comprises dopant selected from the group consisting of Ge and P.

11. Article according to claim 1, further comprising means for tailoring a gain spectrum of the optical Raman amplifier.

12. Article according to claim 11, wherein said means for tailoring the gain spectrum comprise a filter with wavelength-dependent transmission characteristics.

* * * * *